United States Patent
Rutz

[19]

[11] Patent Number: 5,896,631
[45] Date of Patent: Apr. 27, 1999

[54] SPRING STEEL TAPE TENTERING CLAMP GUIDE RAIL WITH SUCH TAPE

[75] Inventor: Andreas Rutz, Lindau, Germany

[73] Assignee: Lindauer Dornier Gesellschaft mbH, Lindau, Germany

[21] Appl. No.: 09/056,422

[22] Filed: Apr. 7, 1998

Related U.S. Application Data

[63] Continuation-in-part of application No. 09/033,390, Mar. 2, 1998.

[30] Foreign Application Priority Data

Apr. 21, 1997 [DE] Germany .......................... 297 07 124

[51] Int. Cl.$^6$ ...................................................... D06C 3/00
[52] U.S. Cl. ...................................................... 26/89; 26/93
[58] Field of Search ................................ 26/89, 93, 91, 26/87, 88, 72, 73, 98; 226/170, 173

[56] References Cited

U.S. PATENT DOCUMENTS

| | | |
|---|---|---|
| 3,457,608 | 7/1969 | Gageur ........................................ 26/93 |
| 3,638,289 | 2/1972 | Dornier et al. ............................... 26/93 |
| 4,639,984 | 2/1987 | Langer ........................................ 26/94 |
| 4,736,498 | 4/1988 | Langer et al. . | 
| 5,161,674 | 11/1992 | Rutz et al. . |
| 5,341,547 | 8/1994 | Rutz . |
| 5,367,753 | 11/1994 | Mueller . |
| 5,390,398 | 2/1995 | Rutz et al. . |
| 5,613,284 | 3/1997 | Hosmer ....................................... 26/89 |
| 5,768,755 | 6/1998 | Hemmerich ................................. 26/89 |

FOREIGN PATENT DOCUMENTS 2558765  11/1977  Germany .
19515036  10/1996  Germany .

*Primary Examiner*—Amy Vanatta
*Attorney, Agent, or Firm*—W. F. Fasse; W. G. Fasse

[57] ABSTRACT

Spring steel tapes are shaped with tape edge sections extending alongside a central tape section having a constant thickness, so that the thickness of the tape edge sections diminishes from the central section to the edges. Such tapes are combined in tape packages to form guide rails for tentering clamps, whereby a continuous contact between tentering clamp guide rollers and the guide rails is assured.

15 Claims, 2 Drawing Sheets

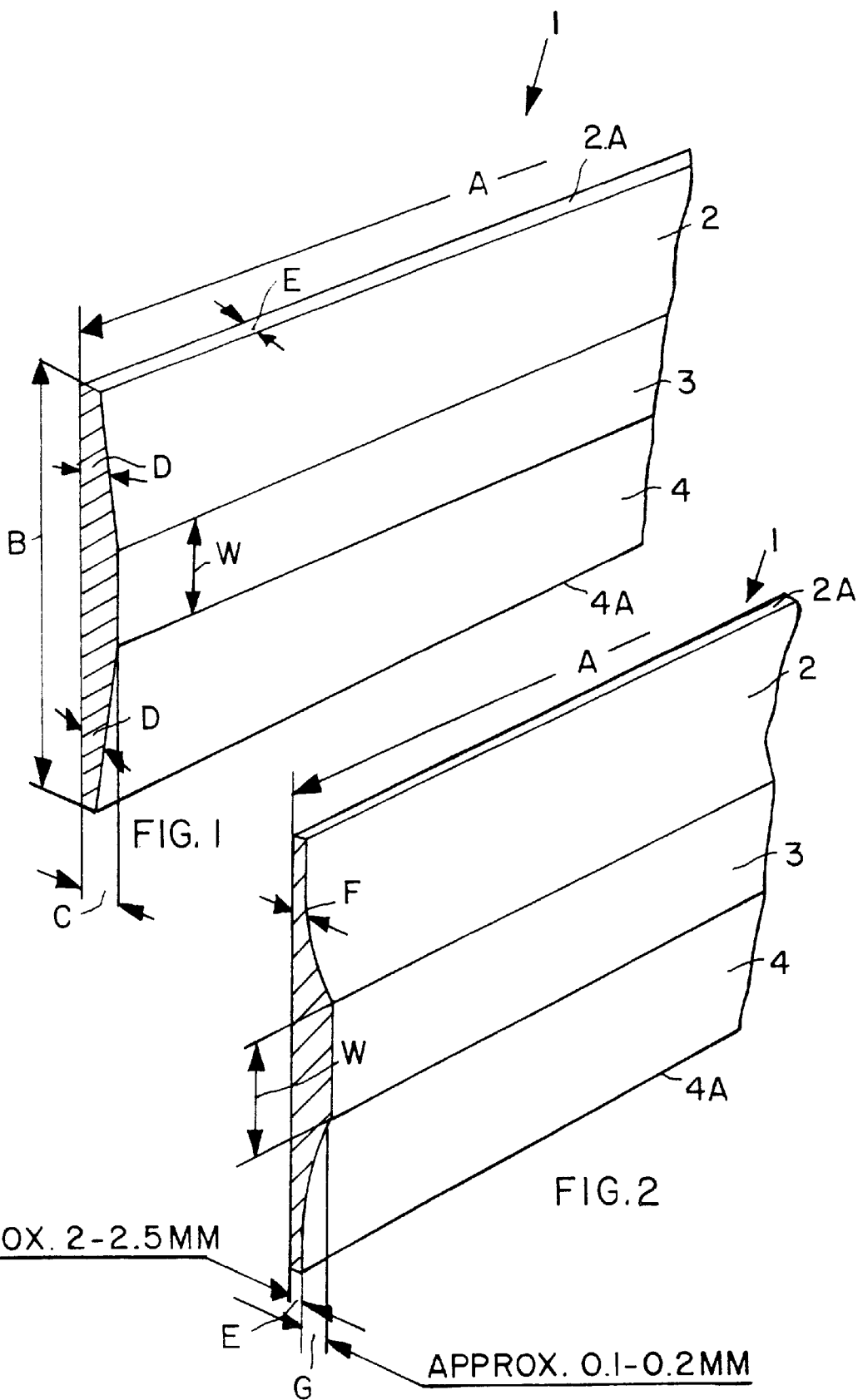

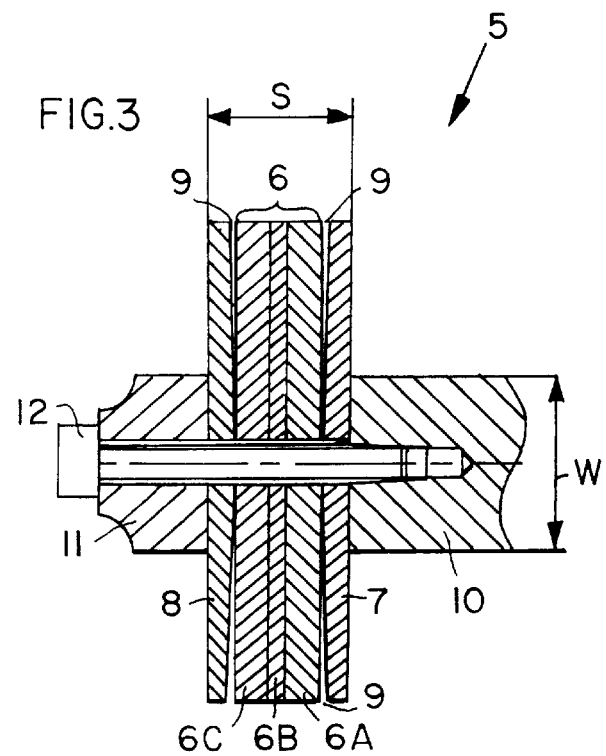
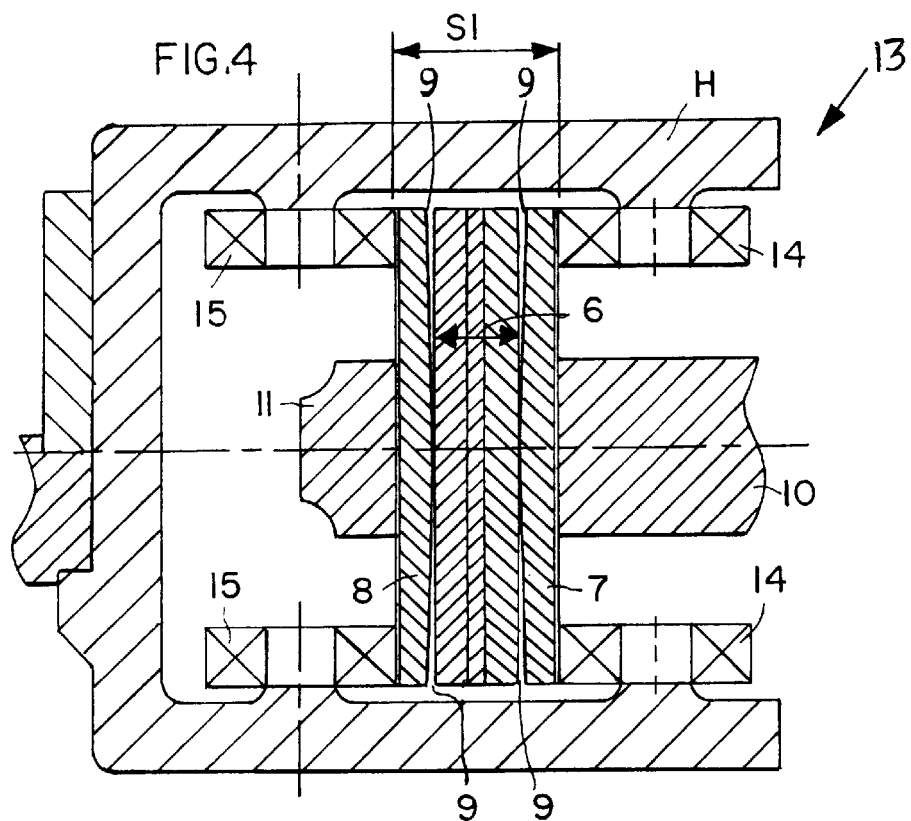

SPRING STEEL TAPE TENTERING CLAMP GUIDE RAIL WITH SUCH TAPE

CROSS-REFERENCE TO RELATED APPLICATION

The present application is a Continuation-In-Part application of our copending, commonly assigned application U.S. Ser. No. 09/033,390, filed on Mar. 2, 1998. The disclosure of the copending application is incorporated herein by reference.

PRIORITY CLAIM

This application is based on and claims the priority under 35 U.S.C. §119, of German Utility Model Application 297 07 124.6, filed on Apr. 21, 1997. The entire disclosure of German Utility Model Application 297 07 124.6 is incorporated herein by reference.

FIELD OF THE INVENTION

The invention relates to spring steel tape for a guide rail used in tentering frames such as film stretching machines in which the guide rails guide tentering chains carrying tentering clamps for holding the material to be stretched.

BACKGROUND INFORMATION

German Patent Publication DE-PS 2,558,765 (Gageur), published on Mar. 24, 1977, discloses a tentering frame for the continuous treatment of web type sheet material. Two guide rails carrying tentering clamps are provided in positions alongside the edges of the web or sheet material to be stretched. Each guide rail comprises individual spring steel tapes arranged on edge so that the tapes extend with their width perpendicularly to the plane of the material being treated. The tapes are clamped together to form the guide rails for the tentering clamps. The tentering clamps are equipped with pairs of guide rollers for the horizontal guiding and with support rollers for the vertical support and guiding.

Ideally, the guide rails should guide the tentering clamps, or rather the rollers carrying the tentering clamps without play. However, in conventional guide rails substantial play may be caused by various factors, such as manufacturing tolerances in the tentering clamps, varying on-center spacings between the vertically oriented axes of the guide rollers, manufacturing tolerances in the thickness of the rolled spring steel tapes and other unavoidable influences. As a result, such play may occur between the guide rollers and the guide rail. Such play has the disadvantage that the guide rollers of the tentering clamps do not always contact the guide rail as they travel along the guide rail, whereby these rollers do not rotate constantly. This does not apply to the upper support rollers which, due to gravity, remain in contact with the respective guide rail.

Depending on the loading and guiding of the tentering clamps during the film stretching operation, either a first set of guide rollers or a second set of guide rollers or guide roller pairs come into contact with the guide rail in alternating fashion. This means that the rotation of the guide rollers may stop after the guide rollers lift off the respective guide rail. Thus, when contact is again established between the guide rollers and the guide rail the rotation of the guide rollers must be accelerated in a very short time to the travel speed of the tentering chain carrying the tentering clamps or rather accelerated to the circumferential velocity of the rollers which rotate in response to the just mentioned travel speed.

Such repeated accelerations and decelerations cause dynamic load changes in or on the tentering chain and on the guide rollers with disadvantageous effects on both especially with regard to an increased wear and tear. The just mentioned dynamic load changes may in a most disadvantageous situation cause the guide rollers to perform sliding motions on the guide rails rather than rolling motions, whereby the outer guide roller surface ring and the respective outer tape of the guide rail are subjected to even greater wear and tear. Depending on the internal friction of the guide roller bearing and of the sealing system of the guide roller bearing damages can occur due to grinding contacts between elements moving relative to each other. Such damage is especially effective on the outer ring surface of the guide roller. Further, damaged guide rollers tend to mechanically damage and impose increased wear on the outer spring steel tapes while simultaneously wearing down the outer guide roller rings. Even before these mechanical damages occur, the guide roller bearing is exposed to heat generated by friction due to the repeated acceleration and deceleration causing the above-mentioned sliding movements. Such friction heat occurs in addition to the relatively high temperatures in the heating zone of the tentering machine.

German Patent Publication DE 195 15 036 A1 (Lindner et al.), published on Oct. 31, 1996, discloses guide rails for tentering clamps of a tentering machine in which an improved guiding of the tentering clamps is achieved, thereby increasing the functional operability and the useful life of the tentering machine. In the Lindner et al. disclosure the spacing between the horizontal guide surfaces of the guide rail and the spacing between the vertical guide surfaces of the guide rail are maintained variable in limited ranges. In other words, the horizontal guide rail thickness and the vertical guide rail width are variable in these limited ranges. For this purpose at least one biasing and/or damping device is provided, whereby at least one of the just mentioned guide surfaces are maintained in a variable position and/or are supported by a damping device. Independently of the construction of the guide rail as a compact single piece or as a combination of differently constructed guide rail elements, the integration of the above-mentioned position variable biasing and/or damping devices into the guide rail involves a complicated structure. As a result, relatively high manufacturing and assembly expenses are involved.

OBJECTS OF THE INVENTION

In view of the above it is the aim of the invention to achieve the following objects singly or in combination:

to construct a spring steel tape for tentering chain guide rails and such a guide rail so that the steel tape itself will maintain a permanent contact with all lateral, horizontal guide rollers of a tentering clamp and so that these rollers cannot lift off the guide rail;

to configure a spring steel tape in such a way that it will have an inherent bias toward the respective guide rollers along the entire length of the tape; and to substantially increase the useful life of the guide rollers as well as of the guide rails by reducing the above mentioned wear and tear.

SUMMARY OF THE INVENTION

The spring steel tape according to the invention is characterized by three sections, namely a central longitudinal section flanked by two longitudinal edge or side sections, whereby the central section has a uniform thickness throughout its length while the edge sections have a thickness that diminishes from the center section toward the edges. Such a configuration gives the spring steel tape the desired spring elastic biasing characteristics.

The spring steel tape guide rail according to the invention comprises a central spring steel tape package and at least two outer spring steel tapes, wherein at least one of the outer spring steel tapes has the above described configuration according to the invention.

According to the invention at least one lateral outer and vertically extending horizontally guiding guide area of the present guide rails is formed by a specially shaped tape having a spring elastic effect that acts on the lateral or horizontal guide rollers of the tentering clamp. This effect is caused by the diminishing thickness of at least one of the outer spring steel tapes that varies in its thickness from the center toward the tape edges. The thickness reduction from the center of the tape toward its edges is preferably but not necessarily symmetrical relative to a longitudinal central axis of the tape. However, the diminishing of the thickness may be geometrically different on each side section. The thickness diminishing may be continuous or linear or it may diminish according to a non-linear function which reduces the thickness more rapidly near the uniform central thickness section of the tape and more slowly toward the edges. In all embodiments a certain edge thickness remains along both edges of the tape. The central tape section has preferably a width in the direction cross-wise to the longitudinal tape axis that corresponds to the width of a mounting element that holds the guide rail in position in the tentering frame. For example, the guide rail may be clamped to the mounting by screws which simultaneously secure the tape packages together.

It is an advantage of the invention if the present spring steel tape is produced by cold rolling, whereby a precise formation of the profile contour of the spring steel tape especially the side with the diminishing thicknesses is formed. Cold rolling is more economical than machining operations which for the present purposes can be advantageously avoided by the cold rolling. The cold rolling can produce any desired cross-sectional thickness contour for the spring steel tape. It is however, important that at least one of the spring steel tapes in the guide rail assures the play reducing function achieved according to the invention so that a firm contact between the guide rail and the rollers of the tentering clamps is assured at all times.

Another advantage of the invention is seen that the useful life of the guide rollers of the tentering clamps and of the guide rails is increased at least for the guide rail tape sections that are in contact with the guide rollers.

BRIEF DESCRIPTION OF THE DRAWINGS

In order that the invention may be clearly understood, it will now be described, by way of example, with reference to the drawings, wherein:

FIG. 1 is a perspective view of a spring steel tape according to the invention having a symmetric linear diminishing thickness of the tape edge sections relative to a central tape section having a uniform thickness;

FIG. 2 is a view similar to that of FIG. 1, but showing a non-linear diminishing of the thicknesses of the tape edge sections;

FIG. 3 shows a sectional view through a guide rail according to the invention secured by screws to a mounting member; and FIG. 4 is a sectional view similar to that of FIG. 3, but illustrating the position of a tentering clamp with its rollers in contact with a guide rail according to the invention.

DETAILED DESCRIPTION OF PREFERRED EXAMPLE EMBODIMENTS AND OF THE BEST MODE OF THE INVENTION

FIG. 1 shows a spring steel tape 1 according to the invention having a tape length A, a tape width B, and a first tape thickness C. The tape 1 has three sections, namely a first edge tape section 2, a second central tape section 3, and a third edge tape section 4 arranged in parallel to each other in the longitudinal direction. The first tape section 2 has a tape edge 2A. The third tape section 4 has a tape edge 4A. The second or central tape section 3 extends between the two outer sections 2 and 4 and has the uniform thickness C preferably throughout the entire width W of the central tape section and throughout its entire length A. The first and third tape sections 2 and 4 have, according to the invention, a second, diminishing tape thickness D that becomes smaller and smaller in a direction crosswise to the length direction from the central section 3 toward the edges 2A and 4A. The edges 2A and 4A have a remaining third thickness E which may be the same for both edges or it may be different, depending on the diminishing of the thicknesses D from the central thickness C toward the edge thickness E. In FIG. 1 the diminishing of the thickness D takes place continuously and linearly from the center thickness C to the edge thickness E and symmetrically on both side sections 2 and 4 of the tape.

In FIG. 2 the tape sections are provided with the same reference numbers as in FIG. 1 with the exceptions of the diminishing tape thicknesses F and G. In FIG. 2 the tape thickness F diminishes non-linearly along a curve that provides a more rapid thickness reduction near the central section 3 and a gradual thickness reduction toward the edges 2A and 4A. As an example, the edge thickness E should be within the range of about 2.0 mm to 2.5 mm, while the thickness reduction from the central thickness C to the edge thickness E indicated by the letter G should be within the range of about 0.1 mm to 0.2 mm. The central constant thickness C would then be in the range of about 2.1 mm to about 2.7 mm. This applies to both embodiments of FIGS. 1 and 2. The thickness E plus the thickness G at the tape edge equals the central thickness C.

The type of thickness diminishing such a linear or nonlinear, continuous or stepwise will determine the spring characteristics of the edge sections 2 and 4. FIG. 3 shows a guide rail 5 according to the invention comprising an inner spring steel tape package 6 and two outer spring steel tapes 7 and 8 according to the invention. The inner tape package 6 comprises, for example, three tapes 6A, 6B and 6C having plane parallel surfaces relative to each other. However, the outer spring tapes 7 and 8 with their configurations shown in FIGS. 1 or 2 form gaps 9 between the plane surfaces of the inner tapes 6A, 6C on the one hand, and the outer tape sections of diminishing thickness of the outer tapes 7 and 8 on the other hand.

All tapes are mounted or secured to a mounting member 10 by a mounting head 11 and screws 12. The width W of the mounting element 10 should preferably correspond to the width W of the central tape section 3 mentioned above. The spring package in its clamped condition forming the rail 5 has a width S that is slightly larger than the width S1 when the guide rail is engaged by a tentering clamp 13 shown in FIG. 4.

As shown in FIG. 4, guide rollers 14 on the right side of a clamp housing H engage the respective horizontally facing surface of the spring steel tape 7. Guide rollers 15 on the left side of the clamp housing H engage the respective horizontally facing surface of the spring steel tape 8. Due to this engagement, the gaps 9 become somewhat smaller, whereby the spring package width S1 is correspondingly slightly smaller than the package width S shown in FIG. 3. The rollers 14, 15 are conventionally mounted in the clamp housing H.

The elasticity of the tapes 7 and 8, due to the diminishing thickness toward the tape edges, is so selected that a constant engagement between the rollers 14, 15 and the tapes 7 and 8 is assured. This elasticity assures in combination or cooperation with the gaps 9, that the constant contact between rollers and tapes is maintained at all times. Thus, a permanent contact avoids the above outlined disadvantages, thereby increasing the useful life of the guide rails and of the tentering clamps.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A spring steel tape for tentering clamp guide rails, said tape comprising a tape length (A), a tape width (B), and a first tape thickness (C), a first tape section (2), a second tape section (3), and a third tape section (4), said tape including a first and a second longitudinal edge (2A, 4A), said first, second and third tape sections (2, 3, 4) extending in parallel to each other along said tape length (A) between said first and second longitudinal tape edges, said second tape section (3) extending between said first and third tape sections (2, 4), said second tape section having said first tape thickness (C), and wherein said first and third tape sections (2, 4) have a second tape thickness (D) that diminishes from said second tape section (3) toward said longitudinal tape edges (2A, 4A).

2. The spring steel tape of claim 1, wherein said second tape thickness (D) diminishes continuously or linearly from said first tape thickness (C) to a third minimal tape thickness (E) along said first and second tape edges (2A, 4A).

3. The spring steel tape of claim 1, wherein said second tape thickness (D) diminishes non-linearly from said first tape thickness (C) to a minimal third tape thickness (E) along said first and second tape edges (2A, 4A).

4. The spring steel tape of claim 1, wherein said second tape section (3) has a width (W) sufficient for connection to a guide rail mounting (10) having a given width.

5. The spring steel tape of claim 1, wherein said tape is made of cold rolled steel.

6. The spring steel tape of claim 1, wherein said second tape section (3) has said first tape thickness (C) that is constant throughout said second tape section.

7. The spring steel tape of claim 1, wherein said second tape section (3) has a planar surface.

8. A guide rail for guiding tentering clamps, comprising a first set of outer spring steel tapes (7, 8) a second set of inner spring steel tapes (6), a plurality of mounting elements (10), clamping elements (11, 12) securing said first (7, 8) and second (6) sets of spring steel tapes to said mounting elements (11, 12) to form a steel tape packet secured to said mounting elements, and wherein at least one of said spring steel tapes of said outer set of steel tapes (7, 8) comprises a tape length (A), a tape width (B), and a first tape thickness (C), a first tape section (2), a second tape section (3), and a third tape section (4), said tape further including a first and a second longitudinal edge (2A, 4A), said first, second and third tape sections (2, 3, 4) extending in parallel to each other along said tape length (A) between said first and second longitudinal tape edges (2A, 4A), said second tape section (3) extending between said first and third tape sections (2, 4), said second tape section having said first tape thickness (C), and wherein said first and third tape sections (2, 4) hhave a second tape thickness (D) that diminishes from said second tape section (3) toward said longitudinal tape edges (2A, 4A).

9. The guide rail of claim 8, wherein said second tape thickness (D) diminishes continuously or linearly from said first tape thickness (C) to a third minimal tape thickness (E) along said first and second tape edges (2A, 4A).

10. The guide rail of claim 8, wherein said second tape thickness (D) diminishes non-linearly from said first tape thickness (C) to a minimal third tape thickness (E) along said first and second tape edges (2A, 4A).

11. The guide rail of claim 8, wherein said second tape section (3) has a width (W) sufficient for connection to a guide rail mounting having a given width.

12. The guide rail of claim 8, wherein said spring steel tapes are made of cold rolled steel.

13. The guide rail of claim 8, wherein said second tape section (3) has said first tape thickness (C) that is constant throughout said second tape section.

14. The guide rail of claim 8, wherein said second tape section has a planar surface.

15. The guide rail of claim 8, further comprising a guide rail mounting (10), and clamping elements (11, 12) securing said first and second sets of spring steel tapes (6, 7, 8) to said guide rail mounting.

\* \* \* \* \*